Figure 1:
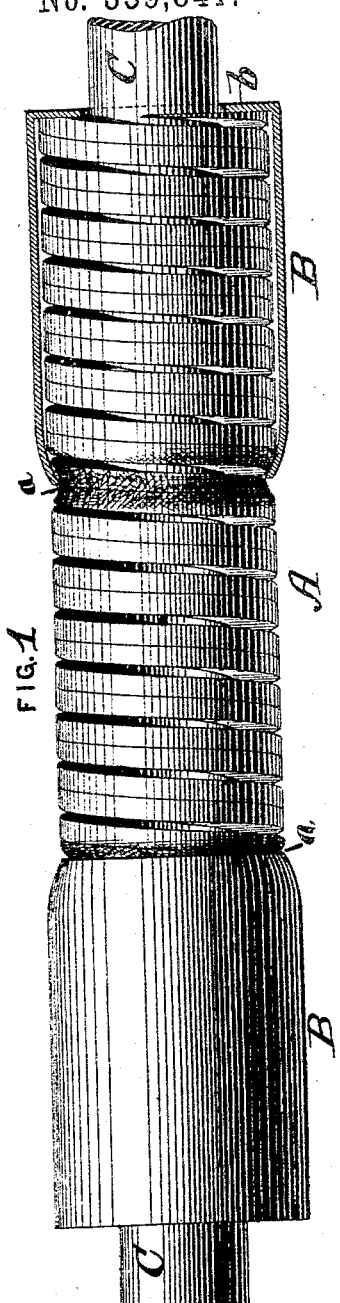

(No Model.)

A. W. BROWNE.
FLEXIBLE DRIVING SPRING.

No. 359,841. Patented Mar. 22, 1887.

WITNESSES:
H. White
Edw. F. Simpson Jr.

INVENTOR:
Arthur W. Browne,
by his Atty
Wm. J. Peyton

United States Patent Office.

ARTHUR W. BROWNE, OF PRINCE'S BAY, N. Y., ASSIGNOR TO THE S. S. WHITE DENTAL MANUFACTURING COMPANY, OF PHILADELPHIA, PA.

FLEXIBLE DRIVING-SPRING.

SPECIFICATION forming part of Letters Patent No. 359,841, dated March 22, 1887.

Application filed July 26, 1886. Serial No. 209,055. (No model.)

*To all whom it may concern:*

Be it known that I, ARTHUR W. BROWNE, a citizen of the United States, residing at Prince's Bay, in the county of Richmond and State of New York, have invented certain new and useful Improvements in Flexible Driving-Springs; and I do hereby declare the following to be a full, clear, and exact description of the invention, such as will enable others skilled in the art to which it appertains to make and use the same.

My invention relates to flexible driving-springs connecting stiff sections of shafting, whereby the shaft is made a flexible one for driving tools in various directions, for example, or to permit one section to rotate at an angle to the other. It has been the custom to unite the tubular flexible springs to the ends of the stiff shaft-sections by forcing the ends of said shaft-sections into the bore of the spring, and this force, in connecting the spring and shaft-sections or in disconnecting them, sometimes injures the spring. To guard against this and improve the operation and strength of the spring, I employ strengthening caps or thimbles for the ends of the spring.

My improvements are sufficiently illustrated in the drawings; and said improvements will be distinctly recited at the close of this specification.

Figure 2:
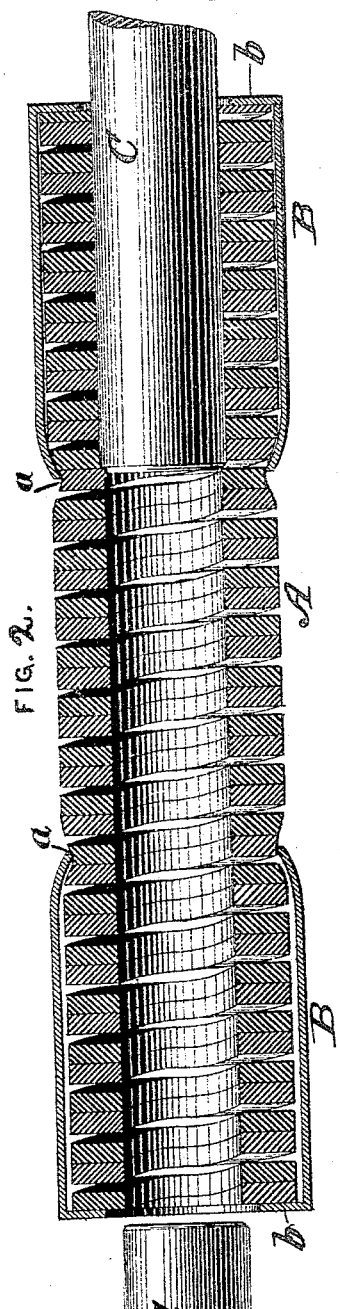
Figure 3:
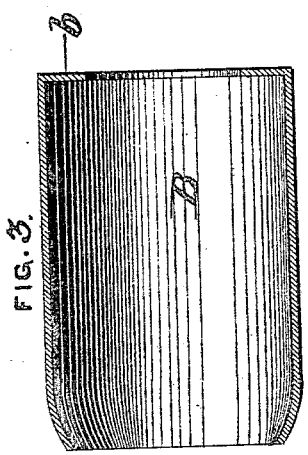
Figure 4:
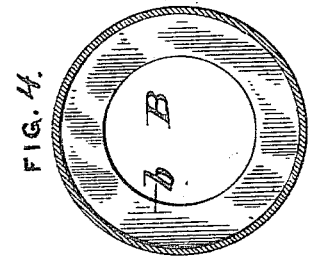

In said drawings, Figure 1 is a view in elevation, partly in section, of my improvements in driving-springs; and Fig. 2 is a longitudinal section therethrough. Fig. 3 is a sectional view of one of the preferred forms of caps or protectors detached, and Fig. 4 is a cross-section thereof.

The spring A is a hollow or tubular one, as usual, and in this instance is shown as made up of two flat strips or ribbons placed side by side and twisted together to form the hollow or tubular spring. This is not claimed herein, however, and constitutes the subject-matter of another previous application, filed June 5, 1886, No. 204,229, for Letters Patent made by me. The spring is provided with circumferential grooves *a a*, with the surfaces of the grooves preferably left rough in turning or forming them. The open ends of caps or thimbles B B are passed on over the ends of the spring, and the ends of said caps are then burnished or pressed down into the grooves *a a*, to securely retain them in place. The protector-cap for the end of the spring is preferably constructed as shown—that is, with the inner end open and the outer end partially closed by a centrally-perforated disk, *b*, to permit the passage of the end of the stiff shaft-section into the bore of the spring.

The capped spring is secured upon the ends of the stiff shaft-sections C C by forcing the shaft ends a short distance into the bore of the spring, which expands to permit the operation, as usual. The interior diameter of the caps B is preferably slightly greater than the external diameter of the spring, so that when the shaft end is inserted in the spring and turned to expand it, to permit the progress of the shaft therein, the expansion of the spring is accommodated.

I have thus illustrated and described my improvements as embodied and organized in the best way now known to me; and

I claim herein as my invention—

1. A flexible driving-shaft consisting of a tubular driving-spring, strengthening-caps on the ends of said spring which allow said ends to expand and contract therein, and stiff shaft-sections united to said spring by being forced into the tubular capped ends thereof, substantially as described.

2. A flexible driving-spring having a groove in its circumference and fitted with an end cap or thimble, secured thereto by engaging said groove, substantially as described.

In testimony whereof I affix my signature in presence of two witnesses.

ARTHUR W. BROWNE.

Witnesses:
W. A. JOHNSTON,
THOMAS C. TOTTEN.